US007080082B2

(12) United States Patent
Elder et al.

(10) Patent No.: US 7,080,082 B2
(45) Date of Patent: Jul. 18, 2006

(54) SYSTEM AND METHOD FOR FINDING THE ACCELERATION OF AN INFORMATION AGGREGATE

(75) Inventors: Michael D. Elder, Greer, SC (US); Jason Y. Jho, Raleigh, NC (US); Vaughn T. Rokosz, Newton, MA (US); Matthew Schultz, Ithaca, NY (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 10/286,263

(22) Filed: Oct. 31, 2002

(65) Prior Publication Data

US 2004/0088275 A1 May 6, 2004

(51) Int. Cl.
*G06F 17/30* (2006.01)

(52) U.S. Cl. .............................. 707/100; 707/3; 706/61

(58) Field of Classification Search ................ 707/1–7, 707/100–104.1, 200, 10; 706/45–50, 61; 709/220–225; 345/440–441; 715/501.1, 715/512–513; 702/187; 705/1–2, 10–12, 705/26–27

See application file for complete search history.

(56) References Cited

U.S. PATENT DOCUMENTS

| 4,908,761 A | 3/1990 | Tai .............................. 364/401 |
| 5,371,673 A | 12/1994 | Fan ....................... 364/419.01 |
| 5,745,113 A | 4/1998 | Jordan et al. ................ 345/349 |
| 5,933,818 A | 8/1999 | Kasravi et al. ................ 706/12 |
| 6,006,223 A | 12/1999 | Agrawa et al. ................. 707/5 |
| 6,018,734 A | 1/2000 | Zhang et al. ................... 707/3 |
| 6,038,561 A * | 3/2000 | Snyder et al. .................. 707/6 |
| 6,070,143 A | 5/2000 | Barney et al. .................. 705/8 |
| 6,115,718 A | 9/2000 | Huberman et al. ......... 707/102 |
| 6,138,128 A | 10/2000 | Perkowitz et al. .......... 707/501 |
| 6,148,294 A | 11/2000 | Beyda et al. ................... 707/1 |
| 6,177,932 B1 | 1/2001 | Galdes et al. ................ 345/733 |
| 6,182,067 B1 | 1/2001 | Presnell et al. ................. 707/5 |
| 6,192,407 B1 * | 2/2001 | Smith et al. ................. 709/229 |
| 6,195,657 B1 | 2/2001 | Rucker et al. .................. 707/5 |
| 6,199,067 B1 | 3/2001 | Geller ........................ 707/10 |
| 6,212,494 B1 | 4/2001 | Boguraev ....................... 704/9 |
| 6,216,098 B1 | 4/2001 | Clancy et al. ................. 703/6 |
| 6,233,583 B1 | 5/2001 | Hoth .......................... 707/102 |
| 6,249,779 B1 | 6/2001 | Hitt ............................... 706/1 |

(Continued)

FOREIGN PATENT DOCUMENTS

JP 2001119403 A 4/2001

(Continued)

OTHER PUBLICATIONS

Jonathan E cook et al. a methodology for cost-effective analysis of In-place software processes, technical report CU-CS-825-97, Jan. 1997, pp. 1-25.*

(Continued)

*Primary Examiner*—Srirama Channavajjala
(74) *Attorney, Agent, or Firm*—Stephen T. Keohane; Shelley M. Beckstrand

(57) ABSTRACT

Information in a database collection of knowledge resources is evaluated by collecting a plurality of documents having non-unique values on a shared attribute into an information aggregate; assigning to each document an usefulness value; and calculating and visualizing the acceleration of the aggregate as a ratio of a sum of the usefulness values for documents recently included in the information aggregate to a sum of the usefulness values for all documents in the aggregate.

10 Claims, 7 Drawing Sheets

U.S. PATENT DOCUMENTS

| | | |
|---|---|---|
| 6,266,649 B1 | 7/2001 | Linden et al. ................. 705/26 |
| 6,275,820 B1 | 8/2001 | Navin-Chandra et al. ....... 707/3 |
| 6,334,127 B1 | 12/2001 | Bieganski et al. ............. 707/5 |
| 6,363,174 B1 | 3/2002 | Lu .............................. 382/209 |
| 6,411,936 B1* | 6/2002 | Sanders ........................ 705/10 |
| 2002/0035593 A1 | 3/2002 | Salim et al. ................. 709/202 |
| 2002/0055940 A1* | 5/2002 | Elkan ....................... 707/104.1 |
| 2003/0014350 A1* | 1/2003 | Duell et al. .................... 705/37 |
| 2003/0061215 A1* | 3/2003 | Messina ......................... 707/9 |
| 2003/0135606 A1* | 7/2003 | Goodwin et al. ........... 709/224 |
| 2004/0019637 A1* | 1/2004 | Goodman et al. .......... 709/204 |
| 2004/0172415 A1* | 9/2004 | Messina et al. .......... 707/104.1 |
| 2004/0205065 A1* | 10/2004 | Petras et al. .................... 707/5 |
| 2004/0230572 A1* | 11/2004 | Omoigui ......................... 707/3 |

FOREIGN PATENT DOCUMENTS

| | | |
|---|---|---|
| WO | WO 0137162 A2 | 5/2001 |
| WO | WO0201455 A2 | 2/2002 |
| WO | WO 2004/081846 A2 * | 9/2004 |

OTHER PUBLICATIONS

Steven R Haynes, "Instituional metrics for the united states marine corps", proceedings of the 36th hawaii international conference on system sciences (HICSS'03), 2002 IEEE, 10 pages.*

Michael G Christel, "accessing news video libraries through dynamic information extraction, summarization, and visualization", visual interfaces to digital libraries, JCDL '01 workshop W1, Jun. 2001, 6 pages.*

Richard Brath, "paper landscapes: a visualization design methodology", no date, 8 pages.*

Randall M Roher et al. national security agency, "web-based information visualization", IEEE Jul./Aug. 1997,pp. 52-59.*

Mahum gershon, et al. "information visualization",interactions . . . Mar. Apr. 1998, pp. 9-15.*

Richard Brath, "concept demonstration metrics for effective information visualization", 1997, pp. 1-4.*

Omar Alonso et al. "database techniques for the analysis and exploration of software repositories", no date, 5 pages.*

Nancy Miller et al. "the need for metrics in visual information analysis", NPIV'97, ACM 1998 pp. 24-28.*

Steven Walczak, "a re-evaluation of information systems publication forums", published in journal of computer information systems, vol. 40, No. 1 fall 1999, pp. 1-15.*

Jade Goldstein et al. "creating and evaluating multi-document sentence extract summaries", ACM 2000, pp. 165-172.*

Ng V et al. "some useful metrics on evaluating educational hypermedia designs", systems, Man, and cybermetics international conference, 1999, vol. 2, Oct. 1999, pp. 247-252.*

Bernhard Braunmuller et al. "multiple similarity queries: A basic DBMS operation for mining in metric databases", IEEE transactions on knowledge and ata engineering, vol. 13, No. 1 Jan./Feb. 2001, pp. 79-95.*

Sado WN et al. A linguistic and statistical approach for extracting knowledge from documents, proceedings of the 15th international workshop on database and expert systems applications, Sep. 2004, pp. 454-458.*

Kulonda, DJ, "the new document methodology: a value creation tool for the enterprise",Management of engineering and technology, 2001, PICMET, vol. 1, Aug. 2001, one page.*

Brouillette, S. M. and J. P. Lavelle. *A Methodology for Mapping and Analyzing Community Social Services as a System*. Norcross, 6th Industrial Engineering Research Conference Proceedings. Miami Beach, May 17-18, 1997. Institute of Industrial Engineers, Norcross, GA, 1997. 662-667.

Sack, W. *Diagrams of Social Cohesion*. Association for Computational Linguistics, U of Maryland. MIT Media Laboratory, Jun. 1999. 3 plus 8 pages.

Kautz, H., B. Selman, M. Shah.. *Referral Web: Combining Social Networks and Collaborative Filtering*. Communications of the ACM, vol. 40, No. 3, Mar. 1997, 1-4 pages.

Schwartz, M. F., D. C. M. Wood. *Discovering shared interests using graph analysis*. Communications of the ACM, v. 36 n. 8 Aug. 1993. 78-89.

Wellman, B. *For a social network analysis of computer networks: a socialogical perspective on collaborative work and virtual community*. Proceedings of the 1996 conference on ACM SIGCPR/SIGMIS. 1-11.

Qureshi, S. *Supporting electronic groupprocesses: a social perspective*. Proceedings of the 1995 ACM SIGCPR Conference on Supporting teams, groups, and learning inside the IS function. ACM Press. 24-34.

Ackerman, M.S., B. Starr. *Social activity indicators: interface components for CSCW systems*. Proceedings of the 8th ACM Symposium on User Interface and Software Technology. ACM Press. 159-168.

Garton, L., C. Haythornthwaite, B. Wellman. *Studying online social networks* in Doing Internet Research, edited by Steve Jones, Thousand Oaks, CA: Sage, 1999, Chaps-4 pp. 75-105.

Srivastava, Jaidepp, Robert Cooley, Mukund Deshpande, Pang-Ning Tan. *Web Usage Mining: Discovery and Applications of Usage Patterns from Web Data*. SIGKDD Explorations, vol. 1, Issue 2. Jan. 2000. 12-23.

Wang, Y. *Web Mining and Knowledge Discovery of Usage Patterns*. CS748T Project (Part 1) Feb. 2000, 25 pages.

Sack, W. *Conversation Map: a content-based Usenet newsgroup browser*. Proceedings of the 2000 International Conference on Intelligent User Interfaces. ACM Press. 233-240.

Kaugers, K. *Integrated multi scale text retrieval visualization*. Conference on Human Factors and Computing Systems, Proceedings o fthe Conference on CHI 98 Summary: Human Factors in Computing Systems, ISBN: 1-58113-028-7 ACM Digital Library, 1998. 307-308.

Feldman, R. *Mining unstructured data*. Tutorial notes for ACK SIGKDD 1999. ACM Press. 182-236.

* cited by examiner

XML FORMAT FOR SQL QUERIES

QRML STRUCTURE

SYSTEM AND METHOD FOR FINDING THE ACCELERATION OF AN INFORMATION AGGREGATE

BACKGROUND OF THE INVENTION

CROSS REFERENCES TO RELATED APPLICATIONS

The following U.S. patent applications are filed concurrently herewith and are assigned to the same assignee hereof and contain subject matter related, in certain respect, to the subject matter of the present application. These patent applications are incorporated herein by reference.

Ser. No. 10/286,211 is now pending, filed 31 Oct. 2002 for "SYSTEM AND METHOD FOR DETERMINING FOUNDERS OF AN INFORMATION AGGREGATE";

Ser. No. 10/286,262 is now pending, filed 31 Oct. 2002 for "SYSTEM AND METHOD FOR FINDING THE RECENCY OF AN INFORMATION AGGREGATE";

Ser. No. 10/286,261 is now pending, filed 31 Oct. 2002 for "SYSTEM AND METHOD FOR EXAMINING THE AGING OF AN INFORMATION AGGREGATE";

Ser. No. 10/286,212 is now pending, filed 31 Oct. 2002 for "SYSTEM AND METHOD FOR DETERMINING CONNECTIONS BETWEEN INFORMATION AGGREGATES";

Ser. No. 10/286,237 is now pending, filed 31 Oct. 2002 for "SYSTEM AND METHOD FOR DETERMINING MEMBERSHIP OF INFORMATION AGGREGATES";

Ser. No. 10/286,508 is now pending, filed 31 Oct. 2002 for "SYSTEM AND METHOD FOR EVALUATING INFORMATION AGGREGATES BY VISUALIZING ASSOCIATED CATEGORIES";

Ser. No. 10/286,145 is now pending, filed 31 Oct. 2002 for "SYSTEM AND METHOD FOR DETERMINING COMMUNITY OVERLAP";

Ser. No. 10/285,799 is now pending, filed 31 Oct. 2002 for "SYSTEM AND METHOD FOR BUILDING SOCIAL NETWORKS BASED ON ACTIVITY AROUND SHARED VIRTUAL OBJECTS"; and Ser. No. 10/286,534 is now pending, filed 31 Oct. 2002 for "SYSTEM AND METHOD FOR ANALYZING USAGE PATTERNS IN INFORMATION AGGREGATES".

TECHNICAL FIELD OF THE INVENTION

This invention relates to a method and system for analyzing trends in an information aggregate. More particularly, it relates to identifying and visualizing acceleration of such aggregates.

BACKGROUND ART

Corporations are flooded with information. The Web is a huge and sometimes confusing source of external information which only adds to the body of information generated internally by a corporation's collaborative infrastructure, including E-mail, Notes databases, QuickPlaces, and so on. With so much information available, it is difficult to determine what's important and what's worth looking at.

There are systems that attempt to identify important documents, but these systems are focused on individual documents and not on aggregates of documents. For example, search engines look for documents based on specified keywords, and rank the results based on how well the search keywords match the target documents. Each individual document is ranked, but collections of documents are not analyzed.

Systems that support collaborative filtering provide a way to assign a value to documents based on user activity, and can then find similar documents. For example, Amazon.com can suggest books to a patron by looking at the books the patron has purchased in the past. The patron can rate these purchases to help the system determine the value of those books to him, and Amazon can then find similar books (based on the purchasing patterns of other people).

The Lotus Discovery Server (LDS) is a Knowledge Management (KM) tool that allows users to more rapidly locate the people and information they need to answer their questions. It categorizes information from many different sources (referred to generally as knowledge repositories) and provides a coherent entry point for a user seeking information. Moreover, as users interact with LDS and the knowledge repositories that it manages, LDS can learn what the users of the system consider important by observing how users interact with knowledge resources. Thus, it becomes easier for users to quickly locate relevant information.

The focus of LDS is to provide specific knowledge or answers to localized inquiries; focusing users on the documents, categories, and people who can answer their questions. There is a need, however, to magnify existing trends within the system—thus focusing on the system as a whole instead of specific knowledge.

It is an object of the invention to provide an improved system and method for detecting and visualizing knowledge trends within a knowledge repository.

SUMMARY OF THE INVENTION

System and method for evaluating information aggregates by collecting a plurality of documents having non-unique values on a shared attribute into an information aggregate; assigning to each document an usefulness value; and calculating and visualizing the acceleration of the aggregate as a ratio of a sum of the usefulness values for documents recently included in the information aggregate to a sum of the usefulness values for all documents in the aggregate.

In accordance with an aspect of the invention, there is provided a computer program product configured to be operable for evaluating information aggregates by visualizing their accelerations.

Other features and advantages of this invention will become apparent from the following detailed description of the presently preferred embodiment of the invention, taken in conjunction with the accompanying drawings.

DETAILED DESCRIPTION OF PREFERRED EMBODIMENTS

Figure 1:
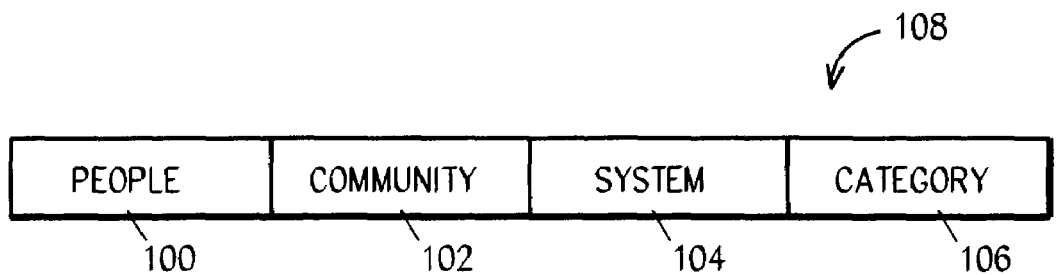
FIG. 1 is a diagrammatic representation of visualization portfolio strategically partitioned into four distinct domains in accordance with the preferred embodiment of the invention.

In accordance with the preferred embodiment of the invention, an acceleration metric is implemented within the context of the Lotus Discovery Server. The Lotus Discovery Server is a system that supports the collection of documents into information aggregates. The aggregates supported by LDS, and to which the acceleration metric are applied, are categories and communities.

The Lotus Discovery Server (LDS) is a Knowledge Management (KM) tool that allows users to more rapidly locate the people and information they need to answer their questions. In an exemplary embodiment of the present invention, the functionality of the Lotus Discovery Server (LDS) is extended to include useful visualizations that magnify existing trends of an aggregate system. Useful visualizations of knowledge metric data store by LDS are determined, extracted, and visualized for a user.

On its lowest level, LDS manages knowledge resources. A knowledge resources is any form of document that contains knowledge or information. Examples include Lotus WordPro Documents, Microsoft Word Documents, webpages, postings to newsgroups, etc. Knowledge resources are typically stored within knowledge repositories—such as Domino.Doc databases, websites, newsgroups, etc.

When LDS is first installed, an Automated Taxonomy Generator (ATG) subcomponent builds a hierarchy of the knowledge resources stored in the knowledge repositories specified by the user. For instance, a document about working with XML documents in the Java programming language stored in a Domino.Doc database might be grouped into a category named 'Home>Development>Java>XML'. This categorization will not move or modify the document, just record its location in the hierarchy. The hierarchy can be manually adjusted and tweaked as needed once initially created.

A category is a collection of knowledge resources and other subcategories of similar content, generically referred to as documents, that are concerned with the same topic. A category may be organized hierarchically. Categories represent a more abstract re-organization of the contents of physical repositories, without displacing the available knowledge resources. For instance, in the following hierarchy:

Home (Root of the hierarchy)
Animals
  Dogs
  Cats
Industry News and Analysis
  CNN
  ABC News
  MSNBC 'Home>Animals', 'Home>Industry News and Analysis', and 'Home>Industry News and Analysis>CNN' are each categories that can contain knowledge resources and other subcategories. Furthermore, 'Home>Industry News and Analysis>CNN' might contain documents from www.cnn.com and documents created by users about CNN articles which are themselves stored in a Domino.Doc database.

A community is a collection of documents that are of interest to a particular group of people collected in an information repository. The Lotus Discovery Server (LDS) allows a community to be defined based on the information repositories used by the community. Communities are defined by administrative users of the system (unlike categories which can be created by LDS and then modified). If a user interacts with one of the repositories used to define Community A, then he is considered an active participant in that community. Thus, communities provide a mechanism for LDS to observe the activity of a group of people.

As a user interacts with knowledge resources, LDS learns which categories they interact with the most. LDS maintains a score for the user, known as an affinity. An affinity is a rank that numerically captures how often a user interacts with a particular category compared to the level of interaction of other users. Affinities within the system are only important in relation to the other affinities. Once a user's affinity reaches a certain threshold, LDS asks the user if he would like to publish that affinity. These affinities can then be made public, so that when other users search on a topic, LDS can identify users who have higher affinities and are presumably more knowledgeable on that topic.

These affinities are extremely useful in making inferences about the interests of the users of the system, and in understanding the knowledge trends. Affinities may be used to reflect when a particular category (or topic of information) becomes more important than others, indicating that the organization is losing or gaining interest in some topic.

LDS maintains a score, or document value, for a knowledge resource (document) which is utilized to indicate how important it is to the users of the system. For instance, a document that has a lot of usage, or activity around it—such as reading the document, responding to the document, editing the document, or referencing the document from a different document—is perceived as more important than documents which are rarely accessed.

Another capability of LDS is its search functionality. Instead of returning only the knowledge resources (documents) that a standard web-based search engine might locate, LDS also returns the categories that the topic might be found within and the people that are most knowledge about that topic. LDS takes the users' affinities and the document values it has calculated into account when returning the results of a search. Thus, users with high affinities for a particular topic and documents that are rated with a higher document value are more likely to be returned. The present invention is unrelated to utilizing or extending this kind of localized searching functionality, but rather magnifies the larger trends within the system on a more general level.

The system and method of the preferred embodiments of the invention are built on a framework that collectively integrates data-mining, user-interface, visualization, and server-side technologies. An extensible architecture provides a layered process of transforming data sources into a state that can be interpreted and outputted by visualization components. This architecture is implemented through Java, Servlets, JSP, SQL, XML, and XSLT technology, and essentially adheres to a model-view controller paradigm, where interface and implementation components are separated.

This allows effective data management and server side matters such as connection pooling to be independent In accordance with the preferred embodiment of the invention, information visualization techniques are implemented through the three main elements including bar charts, pie charts, and tables. Given the simplicity of the visualization types themselves, the context in which they are contained and rendered is what makes them powerful mediums to reveal and magnify hidden knowledge dynamics within an organization.

Referring to FIG. 1, a visualization portfolio is strategically partitioned into four distinct domains, or explorers: people 100, community 102, system 104, and category 106. The purpose of these partitioned explorers 100–106 is to provide meaningful context for the visualizations. The raw usage pattern metrics produced from the Lotus Discovery Server (LDS) do not raise any significant value unless there is an applied context to it. In order to shed light on the hidden relationships behind the process of knowledge creation and maintenance, there is a need to ask many important questions. Who are the knowledge creators? Who are the ones receiving knowledge? What group of people are targeted as field experts? How are groups communicating with each other? Which categories of information are thriving or lacking activity? How is knowledge transforming through time? While answering many of these questions, four key targeted domains, or explorer types 100–106 are identified, and form the navigational strategy for user interface 108. This way, users can infer meaningful knowledge trends and dynamics that are context specific.

People Domain 100

People explorer 100 focuses on social networking, community connection analysis, category leaders, and affinity analysis. The primary visualization component is table listings and associations.

Community Domain 102

Community explorer 102 focuses on acceleration, associations, affinity analysis, and document analysis for communities. The primary visualization components are bar charts and table listings. Features include drill down options to view associated categories, top documents, and top contributors.

One of the most interesting of the community visualizations is how fast the community is growing. This allows a user to instantly determine which communities are growing and which communities are stabilizing. A stabilizing community is one in which the user base has not grown much recently. That does not mean necessarily that the community is not highly active, it simply means that there have not been many additions in the user base. Communities that grow quickly could indicate new teams that are forming, and also denote spurts in the interests of the user base in a new topic (perhaps sales of a new product or a new programming language).

(a) Community listing by Document volume (b) Community listing by Document values Communities group users by similar interests. Metrics that relate to communities help to quickly gauge the activities of a group of people with similar interests. Essentially, these metrics help gauge the group of people, whereas the category visualizations help to gauge knowledge trends.

Like the category visualizations, total document volume and the total document value by communities are measured. In the case of each of these, documents are linked to the repositories, and then those repositories are linked to the communities which use them. Once the document sets for each community are determined, calculations similar to those of categories are performed. For document volume, the documents are counted, with one count for each document. In the case of document value, the documents are summed up by their value and visualized in a similar manner to the category visualizations.

(c) Community Acceleration

Community acceleration looks at the rate at which value is being generated by the community. Each document monitored by the LDS is assigned a document value; these values can be summed up across all of the documents that are contained within the repositories that are part of the community. By looking at how this sum of document values changes over time, communities can be identified that are potentially interesting. Communities where the total document value is increasing rapidly are worth examining because these communities are potentially doing valuable work, and the practices used within these communities should perhaps be adopted in other communities. Conversely, communities that are not adding value may not be thriving, and might therefore be in need of management intervention. The acceleration metric is the subject of this invention, and is described in more detail below.

(d) Community Affinities

Affinities can also be summed up by communities, as they can be for categories. In particular, this allows communities to be ranked by the volume of expertise exhibited by their members. Since affinities are an indirect measure of activity, this visualization also helps point out how active certain communities are in relation to other communities.

(e) Document Activity over Time

This metric allows a more fine-grained measure of community activity. LDS maintains a record of the activity around documents. This means that if a user authors a document, links to a document, accesses a document, etc., LDS remembers this action and later uses this to calculate affinities. However, by analyzing these metrics relative to the available communities, an idea of the aggregate activity of a community in relation to the individual metrics may be derived. That is, by summing all of the 'author' metrics for communities A, B, C, etc, and doing this for all possible metrics, yields a quick visualization of the total document activity over time, grouped by community.

System Overview

Figure 2:
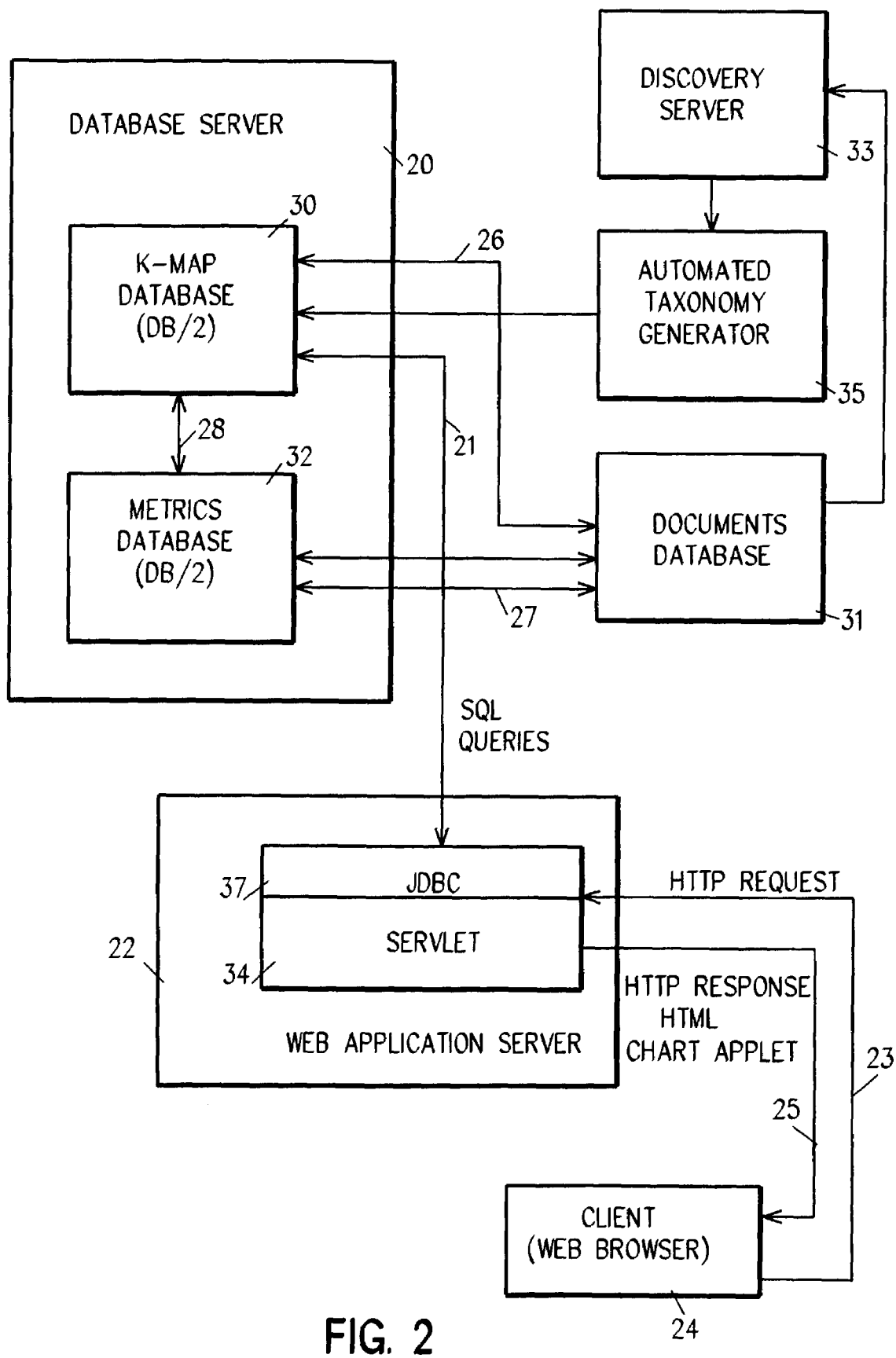
FIG. 2 is a system diagram illustrating a client/server system in accordance with the preferred embodiment of the invention.

Referring to FIG. 2, an exemplary client/server system is illustrated, including database server 20, discovery server 33, automated taxonomy generator 35, web application server 22, and client browser 24.

Knowledge management is defined as a discipline to systematically leverage information and expertise to improve organizational responsiveness, innovation, competency, and efficiency. Discovery server 33 (e.g. Lotus Discovery Server) is a knowledge system which may deployed across one or more servers. Discovery server 33 integrates code from several sources (e.g., Domino, DB2, InXight, KeyView and Sametime) to collect, analyze and identify relationships between documents, people, and topics across an organization. Discovery server 33 may store this information in a data store 31 and may present the information for browse/query through a web interface referred to as a knowledge map (e.g., K-map) 30. Discovery server 33 regularly updates knowledge map 30 by tracking data content, user expertise, and user activity which it gathers from various sources (e.g. Lotus Notes databases, web sites, file systems, etc.) using spiders.

Database server 20 includes knowledge map database 30 for storing a hierarchy or directory structure which is generated by automated taxonomy generator 35, and metrics database 32 for storing a collection of attributes of documents stored in documents database 31 which are useful for forming visualizations of information aggregates. The k-map database 30, the documents database 31, and the metrics database are directly linked by a key structure represented by lines 26, 27 and 28. A taxonomy is a generic term used to describe a classification scheme, or a way to organize and present information, Knowledge map 30 is a taxonomy, which is a hierarchical representation of content organized by a suitable builder process (e.g., generator 35).

A spider is a process used by discovery server 33 to extract information from data repositories. A data repository (e.g. database 31) is defined as any source of information that can be spidered by a discovery server 33.

Java Database Connectivity API (JDBC) 37 is used by servlet 34 to issue Structured Query Language (SQL) queries against databases 30, 31, 32 to extract data that is relevant to a users request 23 as specified in a request parameter which is used to filter data. Documents database 31 is a storage of documents in, for example, a Domino database or DB2 relational database.

The automated taxonomy generator (ATG) 35 is a program that implements an expectation maximization algorithm to construct a hierarchy of documents in knowledge map (K-map) metrics database 32, and receives SQL queries on link 21 from web application server 22, which includes servlet 34. Servlet 34 receives HTTP requests on line 23 from client 24, queries database server 20 on line 21, and provides HTTP responses, HTML and chart applets back to client 24 on line 25.

Discovery server 33, database server 20 and related components are further described in U.S. patent application Ser. No. 10,044,914 is now pending filed 15 Jan. 2002 for System and Method for Implementing a Metrics Engine for Tracking Relationships Over Time.

Figure 3:
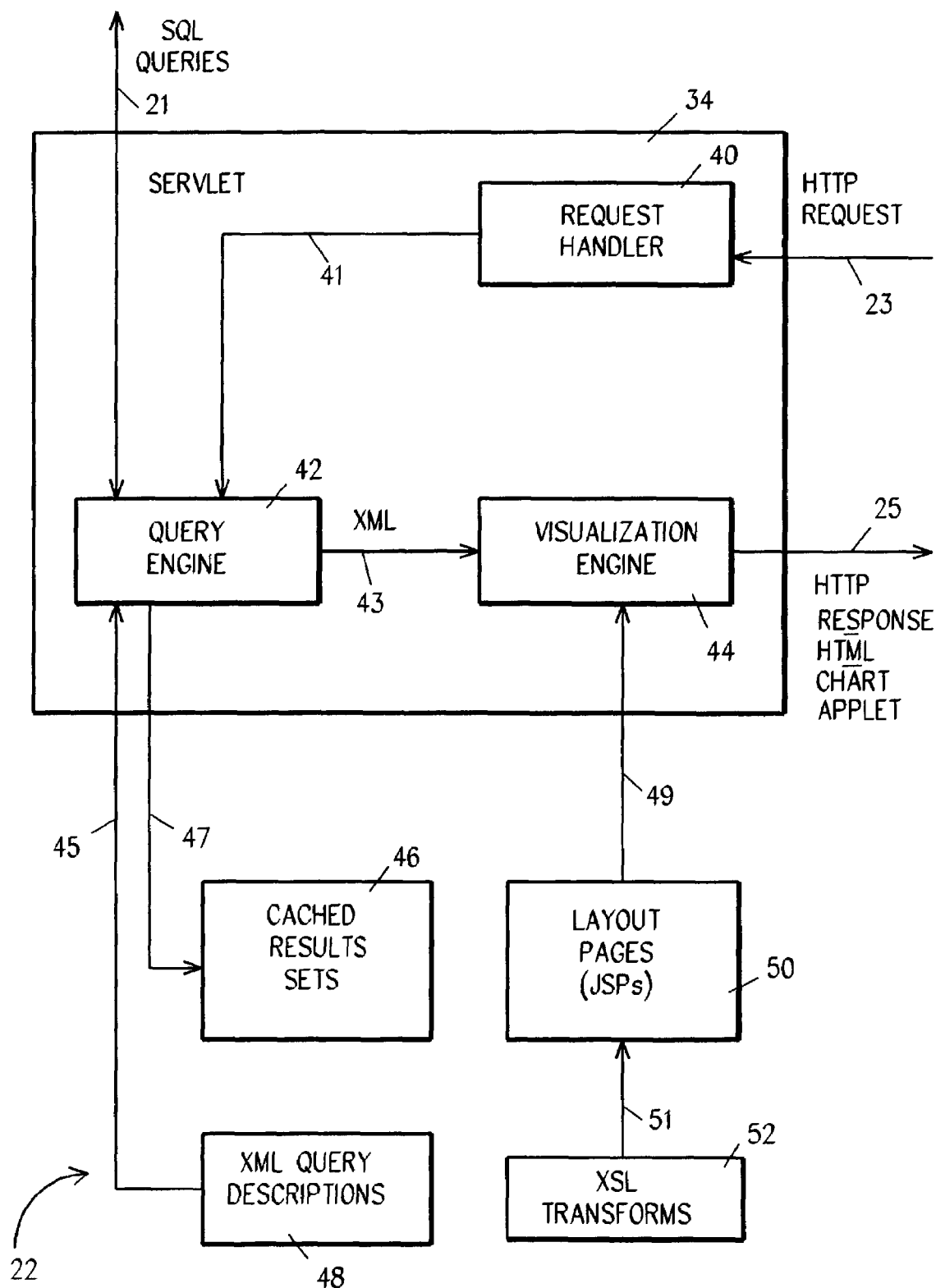
FIG. 3 is a system diagram further describing the web application server of FIG. 2.

Referring to FIG. 3, web application server 22 is further described. Servlet 34 includes request handler 40 for receiving HTTP requests on line 23, query engine 42 for generating SQL queries on line 21 to database server 20 and result set XML responses on line 43 to visualization engine 44. Visualization engine 44, selectively responsive to XML 43 and layout pages (JSPs) 50 on line 49, provides on line 25 HTTP responses, HTML, and chart applets back to client 24. Query engine 42 receives XML query descriptions 48 on line 45 and caches and accesses results sets 46 via line 47. Layout pages 50 reference XSL transforms 52 over line 51.

In accordance with the preferred embodiment of the invention, visualizations are constructed from data sources 32 that contain the metrics produced by a Lotus Discovery Server. The data source 32, which may be stored in an IBM DB2 database, is extracted through tightly coupled Java and XML processing.

Figure 4:
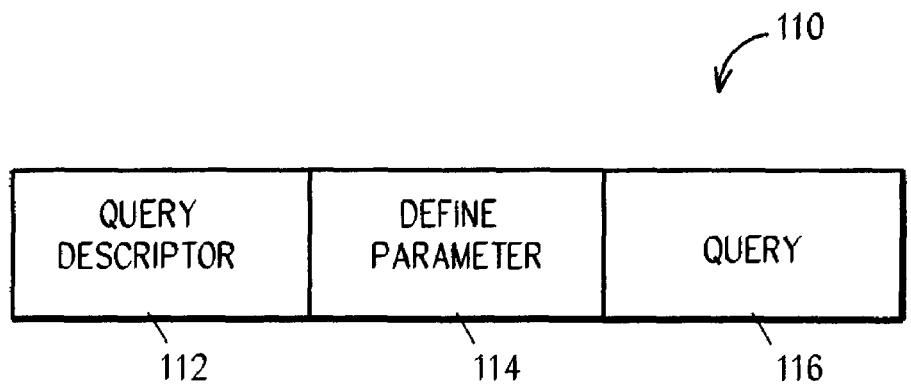
FIG. 4 is a diagrammatic representation of the XML format for wrapping SQL queries.

Referring to FIG. 4, the SQL queries 21 that are responsible for extraction and data-mining are wrapped in a result set XML format having a schema (or structure) 110 that provides three main tag elements defining how the SQL queries are executed. These tag elements are <queryDescriptor> 112, <defineparameter> 114, and <query> 116.

The <queryDescriptor> element 112 represents the root of the XML document and provides an alias attribute to describe the context of the query. This <queryDescriptor> element 112 is derived from http request 23 by request handlekr 40 and fed to query engine 42 as is represented by line 41.

The <defineparameter> element 114 defines the necessary parameters needed to construct dynamic SQL queries 21 to perform conditional logic on metrics database 32. The parameters are set through its attributes (localname, requestParameter, and defaultvalue). The actual parameter to be looked up is requestParameter. The localname represents the local alias that refers to the value of requestParameter. The defaultvalue is the default parameter value.

QRML structure 116 includes <query> element 116 containing the query definition. There can be one or more <query> elements 116 depending on the need for multiple query executions. A<data> child node element is used to wrap the actual query through its corresponding child nodes. The three essential child nodes of <data> are <queryComponent>, <useParameter>, and <queryAsFullyQualified>. The <querycomponent> element wraps the main segment of the SQL query. The <useparameter> element allows parameters to be plugged into the query as described in <defineParameter>. The <queryAsFullyQualified> element is used in the case where the SQL query 21 needs to return an unfiltered set of data.

When a user at client browser 24 selects a metric to visualize, the name of an XML document is passed as a parameter in HTTP request 23 to servlet 34 as follows:

<input type=hidden name="queryAlias"value="Affinity PerCategory">

In some cases, there is a need to utilize another method for extracting data from the data source 32 through the use of a generator Java bean. The name of this generator bean is passed as a parameter in HTTP request 23 to servlet 34 as follows:

<input type=hidden name="queryAlias"value="PeopleIn CommonByCommGenerator">

Once servlet 34 receives the XML document name or the appropriate generator bean reference at request handler 40, query engine 42 filters, processes, and executes query 21. Once query 21 is executed, data returned from metrics database 32 on line 21 is normalized by query engine 42 into an XML format 43 that can be intelligently processed by a stylesheet 52 further on in the process.

Figure 5:
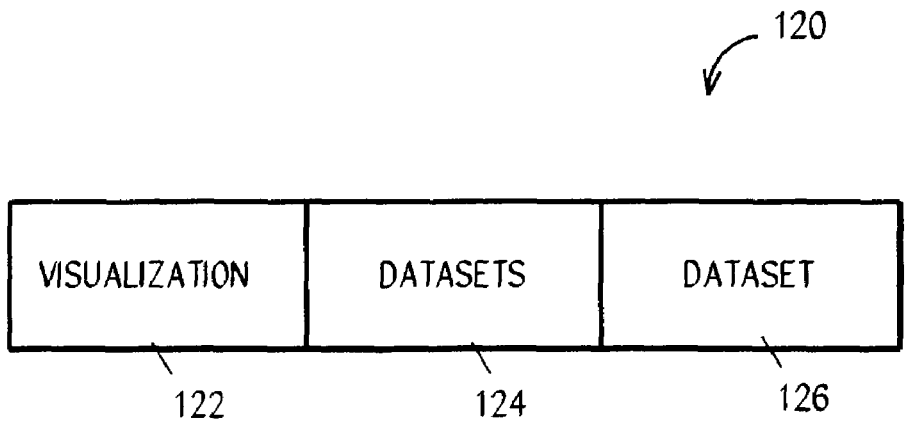
FIG. 5 is a diagrammatic representation of a normalized XML format, or QRML.

Referring to FIG. 5, the response back to web application server 22 placed on line 21 is classified as a Query Response Markup Language (QRML) 120. QRML 120 is composed of three main elements. They are <visualization> 122, <datasets> 124, and <dataset> 126. QRML structure 120 describes XML query descriptions 48 and the construction of a result set XML on line 43.

The <visualization> element 122 represents the root of the XML document 43 and provides an alias attribute to describe the tool used for visualization, such as a chart applet, for response 25.

The <datasets> element 124 wraps one or more <dataset> collections depending on whether multiple query executions are used.

The <dataset> element 126 is composed of a child node <member> that contains an attribute to index each row of returned data. To wrap the raw data itself, the <member> element has a child node <elem> to correspond to column data.

Data Translation and Visualization

Referring further to FIG. 3, for data translation and visualization, in accordance with the architecture of an exemplary embodiment of the invention, an effective delineation between the visual components (interface) and the data extraction layers (implementation) is provided by visualization engine 44 receiving notification from query engine 42 and commanding how the user interface response on line 25 should be constructed or appear. In order to glue the interface to the implementation, embedded JSP scripting logic 50 is used to generate the visualizations on the client side 25. This process is two-fold. Once servlet 34 extracts and normalizes the data source 32 into the appropriate XML structure 43, the resulting document node is then dispatched to the receiving JSP 50. Essentially, all of the data packaging is performed before it reaches the client side 25 for visualization. The page is selected by the value parameter of a user HTTP request, which is an identifier for the appropriate JSP file 50. Layout pages 50 receive the result set XML 120 on line 43, and once received an XSL transform takes effect that executes an XSL transformation to produce parameters necessary to launch the visualization.

For a visualization to occur at client 24, a specific set of parameters needs to be passed to the chart applet provided by, for example, Visual Mining's Netcharts solution. XSL transformation 52 generates the necessary Chart Definition Language (CDLs) parameters, a format used to specify data parameters and chart properties. Other visualizations may involve only HTML (for example, as when a table of information is displayed).

An XSL stylesheet (or transform) 52 is used to translate the QRML document on line 43 into the specific CDL format shown above on line 25.

This process of data retrieval, binding, and translation all occur within a JSP page 50. An XSLTBean opens an XSL file 52 and applies it to the XML 43 that represents the results of the SQL query. (This XML is retrieved by calling queryResp.getDocumentElement( )). The final result of executing this JSP 50 is that a HTML page 25 is sent to browser 24. This HTML page will include, if necessary, a tag that runs a charting applet (and provides that applet with the parameters and data it needs to display correctly). In simple cases, the HTML page includes only HTML tags (for example, as in the case where a simple table is displayed at browser 24). This use of XSL and XML within a JSP is a well-known Java development practice.

In Ser. No. 10/286,211 is now pending filed 31 Oct. 2002 (pending) for "SYSTEM AND METHOD FOR DETERMINING FOUNDERS OF AN INFORMATION AGGREGATE", Table 1 illustrates an example of XML structure 110; Table 2 illustrates an example of the normalized XML, or QRML, structure; Table 3 illustrates an example of CDL defined parameters fed to client 24 on line 25 from visualization engine 44; Table 4 illustrates an example of how an XSL stylesheet 52 defines translation; and Table 5 is script illustrating how pre-packaged document node 43 is retrieved and how an XSL transformation 52 is called to generate the visualization parameters.

An exemplary embodiment of the system and method of the invention may be built using the Java programming language on the Jakarta Tomcat platform (v3.2.3) using the Model-View-Controller (MVC) (also known as Model 2) architecture to separate the data model from the view mechanism.

Information Aggregate

Figure 6:
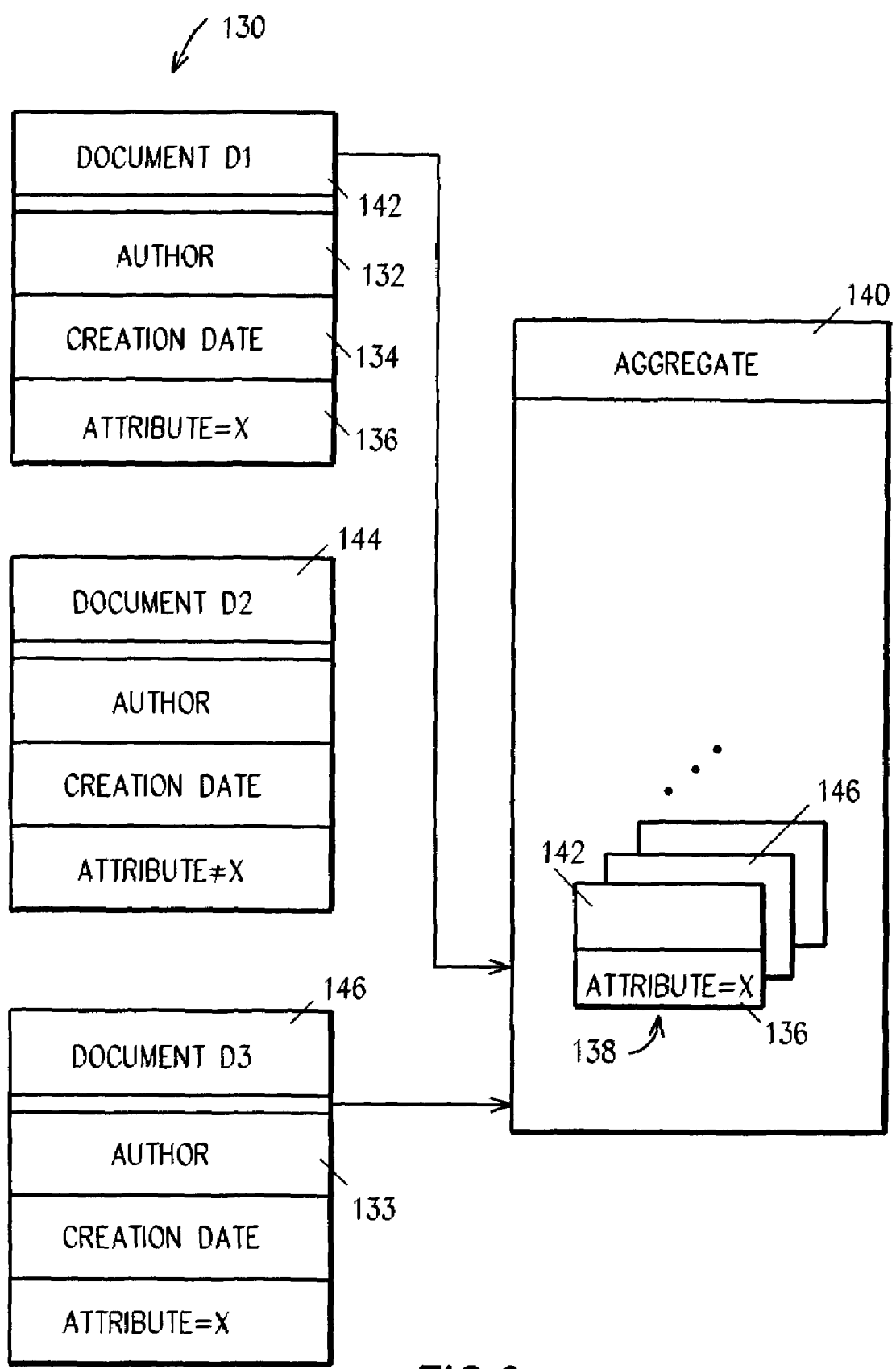
FIG. 6 is a diagrammatic representation of an aggregate in accordance with the preferred embodiment of the invention.

Referring to FIG. 6, a system in accordance with the present invention contains documents 130 such as Web pages, records in Notes databases, and e-mails. Each document 130 is associated with its author 132, and the date of its creation 134. A collection of selected documents 130 forms an aggregates 140. An aggregate 140 is a collection 138 of documents 142, 146 having a shared attribute 136 having non-unique values. Documents 138 can be aggregated by attributes 136 such as:

Category—a collection of documents 130 about a specific topic.
Community—a collection of documents 130 of interest to a given group of people.
Location—a collection of documents 130 authored by people in a geographic location (e.g. USA, Utah, Massachusetts, Europe).
Job function or role—a collection of documents 130 authored by people in particular job roles (e.g. Marketing, Development).
Group (where group is a list of people)—a collection of documents authored by a given set of people.
Any other attributed 136 shared by a group (and having non-unique values).

Acceleration Metric

In accordance with the preferred embodiment of the system and method of the invention, an acceleration metric helps people locate interesting sources of information by looking at the valuation of information aggregates. The main advantage of the acceleration metric is that it can improve organizational effectiveness. If people can identify interesting and useful sources of information more quickly, then they can be more effective in getting their jobs done. Higher effectiveness translates into higher productivity.

Figure 9:
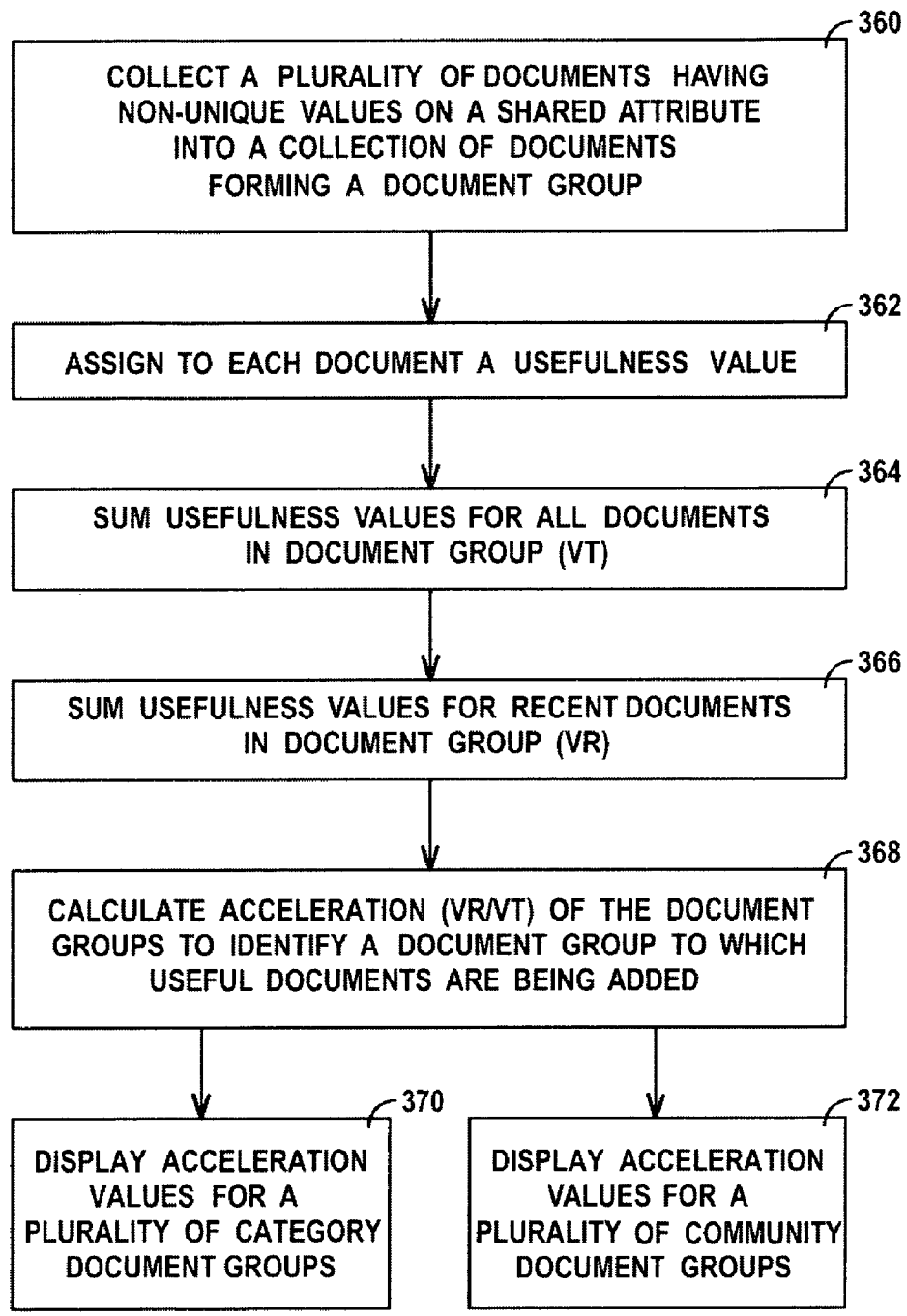
FIG. 9 is a flow chart representation of a preferred embodiment of the invention for visualizing community and category acceleration.

Referring to FIG. 9, in accordance with the preferred embodiment of the invention, a system is provided containing documents, each of which can be assigned a value in step 362 that represents its usefulness. The document values can calculated by the system based on user activity or assigned manually by readers of the document. In step 360, documents are collected together into aggregates. One example of an aggregate might be a category which could group together documents that concern a particular topic.

Acceleration is a measure of how much value has been created recently within an information aggregate. To determine the value of acceleration, in step 364 values for all of the documents included within an aggregate are summed (Vt). In step 366 the values for those documents that are new over a given time period are summed (Vr). In step 368 acceleration is calculated as the ratio of the sum of the values of recent documents (Vr) to the sum of the values for all documents (Vt) (which may be expressed as a percentage or fraction).

The acceleration metric represents the "newness" of an information aggregate. Aggregates that have a high proportion of new documents will have a high acceleration value. Acceleration can also be high for older aggregates if the recently created documents are of high value. In either case, a high value of acceleration is an indicator that the documents in the aggregate may be of greater importance.

The acceleration metric is different from collaborative filtering because it focuses on collections of documents, rather than individual documents. Using a collection to generate metrics can provide more context to people who are looking for information.

Acceleration may be calculated for categories and for communities, and the acceleration values for all categories and communities illustrated in bar charts.

Figure 7:
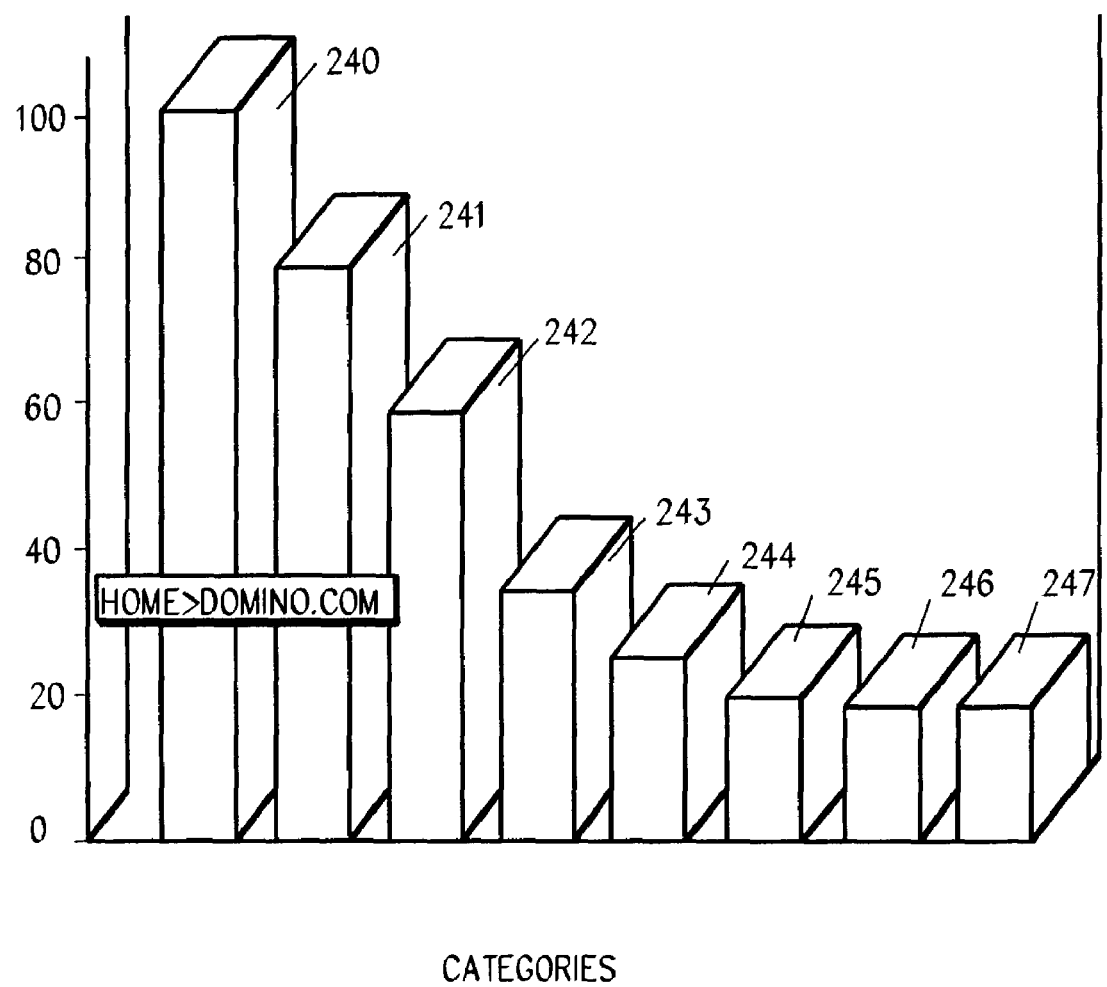
FIG. 7 is a diagrammatic representation of acceleration for a set of categories.

FIG. 7 shows the acceleration for a set of categories 240–247, visualized per step 370 of FIG. 9. In this example, the Domino.Doc category 240 shows a value of acceleration of 100%, which means that all of the value in this category has been added recently (within the period ΔT). This is therefore an area where there is currently high corporate activity.

Figure 8:
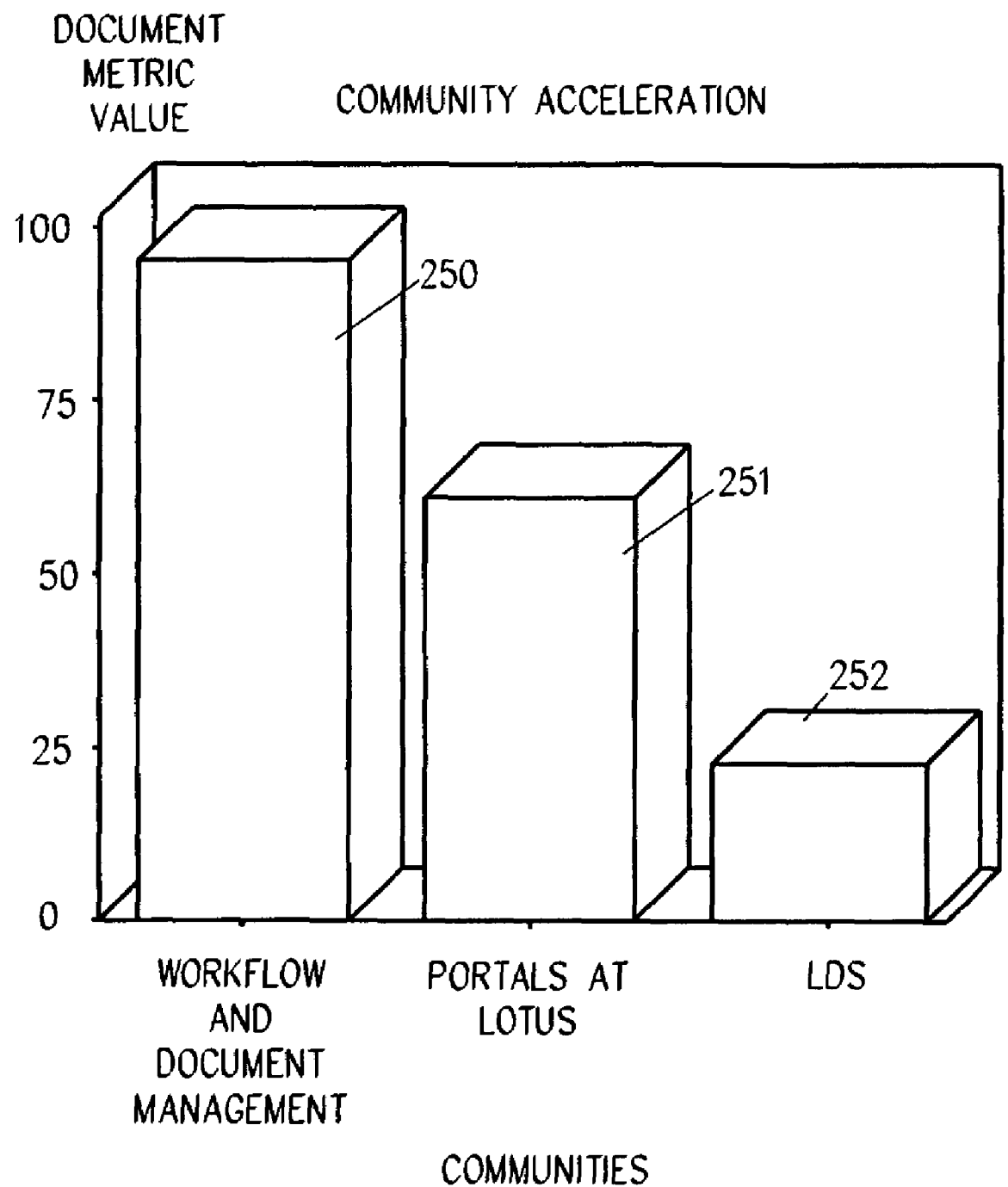
FIG. 8 is a diagrammatic representation acceleration for a set of communities.

FIG. 8 shows the acceleration for a set of communities 250–252, visualized per step 372 of FIG. 9, that illustrates that the Workflow and Document management community 250 has been generating a large proportion of value recently.

In accordance with an exemplary embodiment of the invention, graphic representations of acceleration, as illustrated in FIGS. 7 and 8, are presented on a company's Intranet page where employees can easily see where value is being generated, and investigate further if they have a particular interest in a topic or community.

Advantages over the Prior Art

It is an advantage of the invention that there is provided an improved system and method for detecting and visualizing knowledge trends within a knowledge repository.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product including a computer readable, storage or memory medium, such as a magnetic or optical tape or disc, or the like, for storing program instructions readable by a computer, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, PI/1, Fortran or the like.

Accordingly, the scope of protection of this invention is limited only by the following claims and their equivalents.

We claim:

1. A computer implemented method for evaluating a plurality of document groups, comprising:
    collecting a plurality of documents having non-unique values on a shared attribute into a document group;
    assigning to each said document an usefulness value;
    calculating and, at least temporarily, fixing in computer storage acceleration values for each said document group as a ratio of a sum of said usefulness values for documents recently included in said document group to a sum of said usefulness values for all said documents; and
    visualizing said acceleration values selectively for at least one of a plurality of categories and a plurality of communities at a client display to identify one or more document groups to which useful documents are being added.

2. The method of claim 1, further comprising:
    visualizing said acceleration for a plurality of categories.

3. The method of claim 1, further comprising:
    visualizing said acceleration for a plurality of communities.

4. A computer implemented system for evaluating a plurality of document groups, comprising:
    a metrics database for storing document indicia including document attributes, associated individuals within a cooperative environment, and assigned usefulness value measuring references by said individuals to documents and groupings of documents;
    a query engine responsive to a user request and said metrics database for collecting documents having same, unique attributes in a document group;
    said query engine further for calculating, and at least temporarily fixing in computer storage, acceleration values as the ratio of said usefulness values of documents recently added to said document group to said usefulness values of all documents in said document group; and
    a visualization engine for visualizing said acceleration values selectively for at least one of a plurality of categories and a plurality of communities at a client display to identify one or more document groups to which useful documents are being added.

5. The system of claim 4, said visualization engine visualizing said acceleration values for a plurality of communities.

6. The system of claim 4, said visualization engine visualizing said acceleration values for a plurality of categories.

7. A program storage device readable by a computer, tangibly embodying a program of instructions executable by a computer for evaluating a plurality of document groups, said program of instructions comprising:
    instructions for collecting a plurality of documents having non-unique values on a shared attribute into document group;
    instructions for assigning to each said document an usefulness value;
    instructions for calculating, and at least temporarily fixing in computer storage, acceleration values for each of said document groups as a ratio of a sum of said usefulness values for documents recently included in said document group to a sum of said usefulness values for all said documents to identify one or more document groups to which useful documents are being added; and
    instructions for visualizing said acceleration values selectively for at least one of a plurality of categories and a plurality of communities at a client display to identify one or more document groups to which useful documents are being added.

8. The program storage device of claim 7, said program of instructions further comprising:
    instructions for visualizing said acceleration for a plurality of categories.

9. The program storage device of claim 7, said program of instructions further comprising:
    instructions for visualizing said acceleration for a plurality of communities.

10. A computer program product for evaluating document groups, said computer program product comprising:
  a computer readable storage medium;
  first program instructions to store document indicia in a metrics database, said indicia including document attributes, associated persons and assigned usefulness value;
  second program instructions, responsive to a user request and said metrics database, to collect documents having same, unique attributes in a document group;
  third program instructions to calculate, and at least temporarily fix in computer storage, an acceleration value for said document group as the ratio of said usefulness values of documents recently added to said document group to said usefulness values of all documents in said document group;
  fourth program instructions to visualize said acceleration values selectively for a plurality of categories and a plurality of communities at a client display to identify one or more document groups to which useful documents are being added; and
  said first, second, third, and fourth program instructions being recorded on said computer readable storage medium.

* * * * *